United States Patent
Sheng

(10) Patent No.: US 10,257,718 B2
(45) Date of Patent: Apr. 9, 2019

(54) METHOD FOR CONFIGURING A NETWORK COMPRISING SEVERAL NODES, A METHOD FOR TRANSMITTING DATA IN SAID NETWORK, AND CORRESPONDING EQUIPMENT AND COMPUTER PROGRAM

(71) Applicant: ORANGE, Chatillon (FR)

(72) Inventor: Zhengguo Sheng, Beijing (CN)

(73) Assignee: Orange, Paris (FR)

( * ) Notice: Subject to any disclaimer, the term of this patent is extended or adjusted under 35 U.S.C. 154(b) by 155 days.

(21) Appl. No.: 15/107,252

(22) PCT Filed: Dec. 12, 2014

(86) PCT No.: PCT/IB2014/003051
§ 371 (c)(1),
(2) Date: Jun. 22, 2016

(87) PCT Pub. No.: WO2015/097552
PCT Pub. Date: Jul. 2, 2015

(65) Prior Publication Data
US 2016/0337875 A1    Nov. 17, 2016

(30) Foreign Application Priority Data
Dec. 23, 2013 (WO) ................ PCT/CN2013/090231

(51) Int. Cl.
*H04W 24/02* (2009.01)
*H04L 12/741* (2013.01)
(Continued)

(52) U.S. Cl.
CPC ............ *H04W 24/02* (2013.01); *H04B 1/713* (2013.01); *H04L 45/24* (2013.01); *H04L 45/48* (2013.01);
(Continued)

(58) Field of Classification Search
None
See application file for complete search history.

(56) References Cited

U.S. PATENT DOCUMENTS 7,406,054 B2    7/2008  Seo et al.
9,246,795 B2 *  1/2016  Madaiah ............... H04L 12/437
(Continued)

FOREIGN PATENT DOCUMENTS

| CN | 101990269 A | 3/2011 |
| CN | 102223734 A | 10/2011 |
| WO | 2007/021602 A1 | 2/2007 |

OTHER PUBLICATIONS

Sedat Gormus et al., "Opportunistic communications to improve reliability of AMI mesh networks", 2011 2nd IEEE PES International Conference and Exhibition on Innovative Smart Grid Technologies, XP032136756, pp. 1-8, Dec. 5, 2011.
(Continued)

*Primary Examiner* — Candal Elpenord
(74) *Attorney, Agent, or Firm* — Haverstock & Owens LLP

(57) ABSTRACT

The invention relates to a method for configuring a network comprising several nodes.

Figure 1:
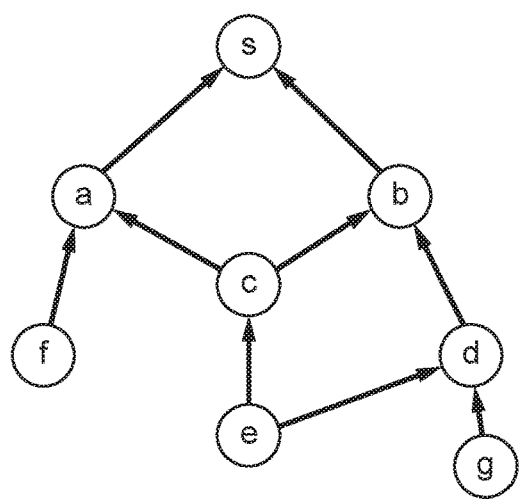

According to the invention, at least one node of said network, called a current node, implements a step of building a relay table identifying at least one node of the network, called a relay node, which is directly connected to the current node and which has at least one parent node in common with at least one parent node of the current node.

18 Claims, 3 Drawing Sheets

(51) Int. Cl.
  *H04W 4/00* (2018.01)
  *H04W 40/10* (2009.01)
  *H04B 1/713* (2011.01)
  *H04W 28/02* (2009.01)
  *H04L 12/707* (2013.01)
  *H04W 40/22* (2009.01)
  *H04L 12/933* (2013.01)
  *H04W 4/70* (2018.01)
  *H04W 40/24* (2009.01)
  *H04L 12/753* (2013.01)

(52) U.S. Cl.
  CPC ............ *H04L 45/54* (2013.01); *H04L 45/745* (2013.01); *H04L 49/1584* (2013.01); *H04W 4/70* (2018.02); *H04W 28/0268* (2013.01); *H04W 40/10* (2013.01); *H04W 40/22* (2013.01); *H04W 40/246* (2013.01); *Y02D 70/00* (2018.01); *Y02D 70/21* (2018.01); *Y02D 70/22* (2018.01); *Y02D 70/326* (2018.01); *Y02D 70/39* (2018.01)

(56) References Cited

U.S. PATENT DOCUMENTS

| | | | |
|---|---|---|---|
| 2003/0176931 A1* | 9/2003 | Pednault | G06F 17/30539 700/31 |
| 2011/0116389 A1* | 5/2011 | Tao | H04L 45/18 370/252 |
| 2012/0155475 A1* | 6/2012 | Vasseur | H04L 45/028 370/400 |
| 2014/0071885 A1* | 3/2014 | Cherian | H04W 40/22 370/315 |
| 2014/0204759 A1* | 7/2014 | Guo | H04W 28/08 370/236 |
| 2015/0324410 A1* | 11/2015 | Glover | G06F 17/30958 707/610 |

OTHER PUBLICATIONS

Awiphan S. et al., "ToMo: A Two-Layer Mesh/Tree Structure for Live Streaming in P2P Overlay Network", Consumer Communications and Networking Conference, 2010 7th IEE, Jan. 9, 2010, pp. 1-5, XP031642876, ISBN: 978-1-4244-5175-3.

Zhengguo Sheng et al., "Power Efficient Decode-and -Forward Cooperative Relaying", IEEE Wireless Communications Letters, vol. 1, No. 5, Oct. 1, 2012, pp. 444-447, XP011470594, ISSN:2162-2337.

The International Search Report for the application PCT/IB2014/003051.

The International Search Report for the application PCT/CN2013/090231.

* cited by examiner

METHOD FOR CONFIGURING A NETWORK COMPRISING SEVERAL NODES, A METHOD FOR TRANSMITTING DATA IN SAID NETWORK, AND CORRESPONDING EQUIPMENT AND COMPUTER PROGRAM

1. FIELD OF THE DISCLOSURE

The field of the invention is that of network configuration and data transmission in a network comprising a plurality of nodes, such as a wire or a wireless network, a cellular network or a local network, and so on.

More specifically, the invention provides a technique for cooperation-aided communication in such a network.

The invention finds application especially in Low power and Lossy Networks (LLN), for example for wireless sensor networks or for Machine-to-Machine (M2M) communication—especially the resource constrained M2M communication—to deliver high-speed and high-quality services (for example multi-media service).

2. BACKGROUND OF THE DISCLOSURE

In M2M communication, the routing protocol design to support efficient wireless communication in a multi-hop fashion is extremely important, especially for energy constrained devices.

In order to assist dynamic routing in low power and lossy networks, the IETF Routing over Low-power and Lossy Networks (RoLL) develops a routing protocol, called RPL (Resource Location Protocol).

RPL is a distance vector routing protocol, in which nodes of the network build a Destination Oriented Acyclic Graph (DODAG) by exchanging distance vectors and root to a "controller". Through broadcasting routing constraints, the root node (i.e., central control point) filters out the nodes that do not meet the constraints and select the optimum path according to the metrics. In the stable state, each node has identified a stable set of parent nodes and forwarded packets along the path towards the "root" of the DODAG. An example of DODAG is illustrated in FIG. 1.

However, RPL cannot well support multimedia services in wireless networks. For example, transmitting images in a multi-hop fashion in a harsh outdoor environment to monitor emergency accidents may expect high packet loss. Moreover, because of the hierarchical transmission structure, the nodes close to the root (for example nodes a and b in FIG. 1) may experience more traffic and energy consumption, thus being vulnerable to the energy depletion.

As a consequence, there is a need for a new technique for configuring a network improving at least one of communication reliability and energy efficiency, for example in a low power and lossy networks.

3. SUMMARY OF THE DISCLOSURE

The invention proposes a novel solution that does not have all the drawbacks of the prior art, in the form of a method for configuring a network comprising several nodes, wherein at least one node of said network, called a current node, implements a step of building a relay table identifying at least one node of the network, called a relay node, which is directly connected to the current node and which has at least one parent node in common with at least one parent node of the current node.

The invention can thus be implemented in a new routing protocol, which enable cooperative communication in a network comprising several nodes.

Such a network can be a wire or a wireless network, a cellular or a local network, and so on. It should also be noted that the network could be a hierarchical network or a mesh network. In the case of a hierarchical network, the parent node of a current node is a father node of the current node. The current node and the relay node have the same rank in the hierarchy. In the case of a mesh network, the parent node of a current node is a neighbouring node directly connected to the current node, and which can transmit information to the current node. The "parent node" could thus also be called the "next hop node", which is defined by the routing protocol.

In particular, the network can be a low power and lossy network.

The invention thus proposes a solution for configuring a network improving at least one of communication reliability, with better Quality of Service (QoS) performance, and energy efficiency, to release the burden of some nodes in the network (in particular nodes close to the root), in a low power and lossy network.

In a specific embodiment of the invention, the network is a multi-hop wireless network.

According to one particular embodiment of the invention, the current node also implements a step of building a routing table identifying parent nodes of said current node. Said step of building the relay table compares the routing table of the current node with at least one routing table of at least one node directly connected to the current node, called a neighbouring node, and, if at least one common parent node is identified, stores an identifier of the neighbouring node, which is a relay node, in the relay table.

The current node thus implements both steps of building a routing table identifying at least one node which is a parent of the current node, and of building a relay table identifying at least one relay node which is a neighbour of the current node (having the same rank in the case of a hierarchical network) and which can be used to relay information between the current node and said at least one parent node of the current node.

According to one specific feature of the invention, the step of building the relay table comprises storing a cost associated with a path between the current node and said at least one relay node.

This information can be used to select the best path for data transmission when several paths are available between the current node and a parent node.

In particular, the step of building the relay table is implemented periodically.

The relay table and/or the routing table could also be updated when a change occurs in the network, such as the connection of new equipment in the network, or the overload of some equipment in the network.

According to one specific feature of the invention, the nodes of the network are organized according to a directed acyclic graph.

The method for configuring a network can thus improve the existing RPL routing protocol, and can be considered as a cooperation-aided RPL protocol.

In particular, the step of building the routing table comprises a step of receiving a directed acyclic graph information object message.

Another aspect of the invention concerns a method for transmitting data in a network comprising several nodes, wherein at least one node of said network, called current node, is configured to implement a step of building a relay table identifying at least one node of the network, called a relay node, which is directly connected to the current node and which has at least one parent node in common with at least one parent node of the current node.

According to the invention, said current node implements a step of data transmission comprising the following steps:
 reading the relay table built for the current node,
 selecting a relay node from the relay table, which can be used to relay data between the current node and one of said at least one parent node of the current node,
 transmitting data from the current node to the parent node directly and via the relay node,
so that the parent node can receive and combine data from both the current node and the relay node.

It is thus possible to use cooperative communication to transmit data (for example in the form of packets) in such a network. According to at least one embodiment, such method improves the QoS of the transmission and communication reliability, and releases the burden of some nodes of the network (in particular the nodes close to the root).

Such a method for transmitting data in a network is especially suited to be implemented after, or in parallel to, the method for configuring a network described above. The method for transmitting data could of course comprise all the features of the method for configuring a network. The characteristics and advantages of this method for transmitting data are thus the same as those of the method for configuring the network, and shall not be described in greater detail.

According to one specific feature of the invention, the step of transmitting data to the parent node via the relay node implements a decode-and-forward algorithm.

Such a technique enables to improve the reception quality of the combined signal at the parent node.

According to another feature of the invention, the step of selecting a relay node from the relay table chooses the relay node which has the largest residual energy when several relay nodes are available to relay data between the current node and the parent node.

Such a technique thus enables to improve energy efficiency.

Another embodiment of the invention pertains to an equipment for configuring a network comprising several nodes and transmitting data in said network, wherein said equipment, called current node, comprises a module for configuring itself and a module for data transmission. The module for configuring the current node comprises means for building a relay table identifying at least one node of the network, called a relay node, which is directly connected to the current node and which has at least one parent node in common with at least one parent node of the current node. The module for data transmission comprises:
 means for reading the relay table built for the current node,
 means for selecting a relay node from the relay table, which can be used to relay data between the current node and one of said at least one parent node of the current node, and
 means for transmitting data from the current node to the parent node directly and via the relay node,
so that the parent node can receive and combine data from both the current node and the relay node.

Such an equipment is especially suited to implement the method for configuring a network and/or the method for transmitting data in a network as described above.

The characteristics and advantages of this equipment for transmitting data are thus the same as those of the method for configuring the network and those of the method for transmitting data in a network, and shall not be described in greater detail.

Another aspect of the invention relates to at least one computer program comprising instructions to implement the method for configuring a network comprising several nodes described above and/or the method for transmitting data in a network comprising several nodes described above, when said at least one program is executed by a processor.

It can be noted indeed that the methods according to the invention can be implemented in various ways, especially in wired form or in software form.

4. BRIEF DESCRIPTION OF THE DRAWINGS

Figure 2:
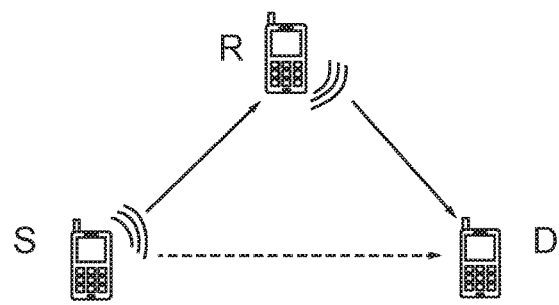
Figure 3:
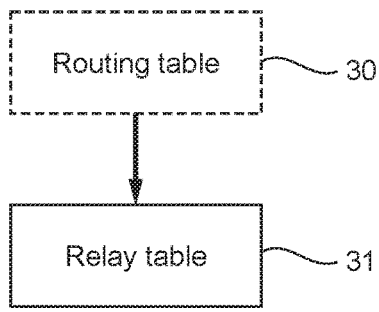
Figure 4:
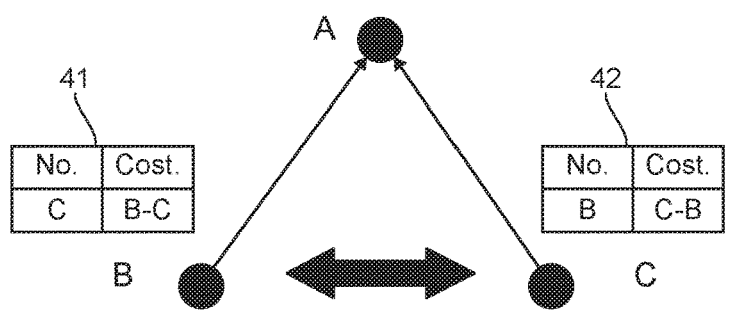
Figure 5:
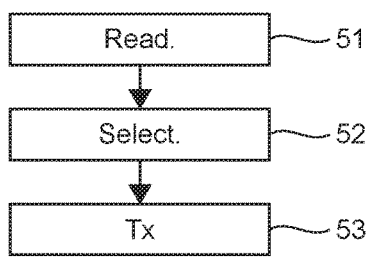
Figure 6A:
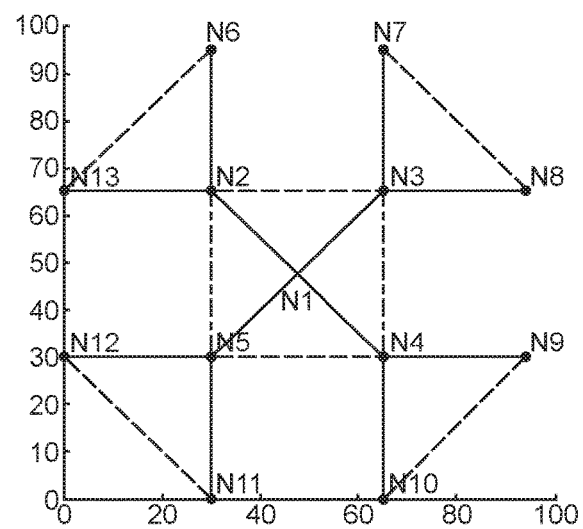
Figure 6B:
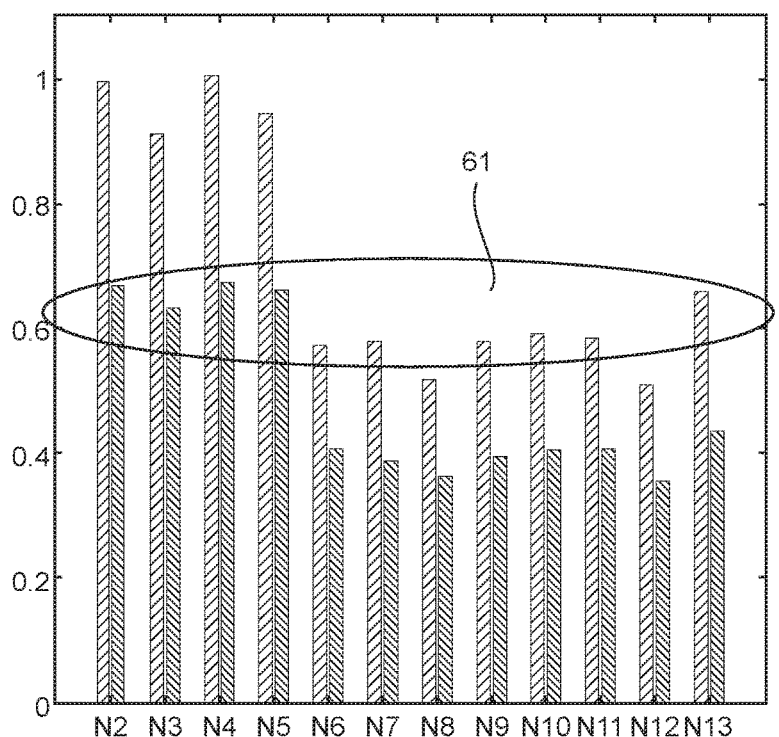
Figure 7A:
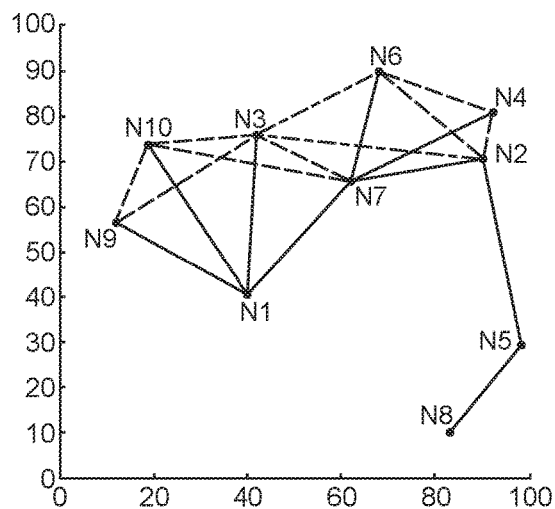
Figure 7B:
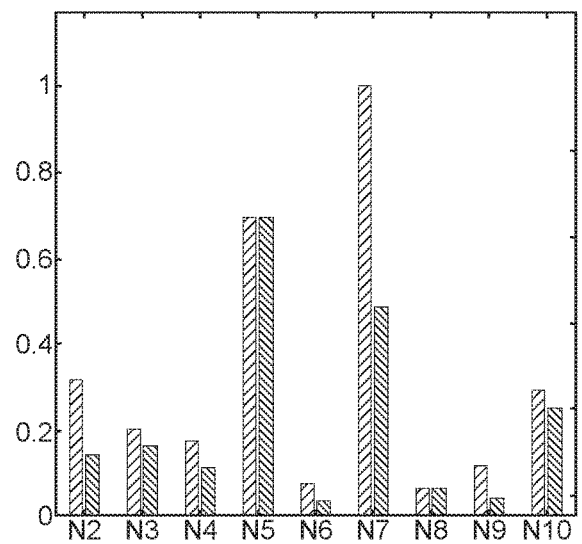
Figure 8:
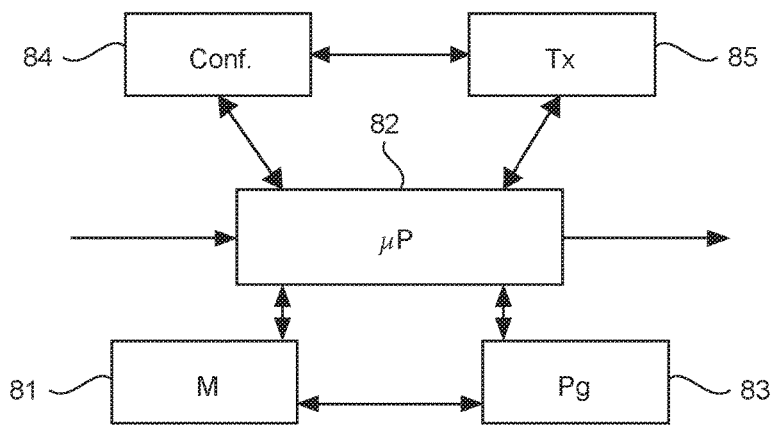

Other features and advantages of the invention shall appear more clearly from the following description of a particular embodiment of the invention, given by way of a simple illustrative and non-exhaustive example, and from the appended drawings of which:
 FIG. 1, described with reference to prior art, discloses an example of RPL routing tree also called DODAG;
 FIG. 2 illustrates an example of wireless cooperative link;
 FIG. 3 presents the main steps of a method for configuring a network according to one embodiment of the invention;
 FIG. 4 shows an example of the building of relay tables according to one specific embodiment of the invention;
 FIG. 5 presents the main steps of a method for transmitting data in a network according to one embodiment of the invention;
 FIGS. 6A and 6B illustrate the performance of cooperation-aided technique as compared to prior art technique according to a grid network scenario;
 FIGS. 7A and 7B illustrate the performance of cooperation-aided technique as compared to prior art technique according to a random network scenario;
 FIG. 8 presents the structure of an equipment of the network according to one particular embodiment of the invention.

5. DETAILED DESCRIPTION OF ILLUSTRATIVE EMBODIMENTS 5.1 Reminders Regarding Cooperative Communication Future wireless networks are expected to support the mixture of real-time applications, such as voice and multimedia streams, and non-real-time data applications, such as web browsing, messaging and file transfers. Hence all of these applications impose stringent and diversified QoS requirements, which cannot be satisfactorily addressed through the traditional communication system. To satisfy the future communication requirements, the concept of cooperative communication mechanisms have been proposed as an effective way of exploiting spatial diversity to improve the quality of wireless links. The key idea is to have multiple wireless devices in different locations, which cooperatively share their antenna resources and aid each other's wireless transmission effectively, in order to form virtual and distributed antenna arrays.

In cooperative communication, the term "cooperation" refers to a node's willingness to share its own resources (e.g., energy, transmission opportunity) for the benefit of other nodes. FIG. 2 illustrates an example of wireless cooperative link, implementing a decode-and-forward (DAF) cooperative communication. More specifically, the transmission of data from a source node (S) to a destination node (D) is aided by a relay node (R). While there are variants of cooperative communication, depending on how the relay node cooperates to the source node's transmission, the relay node's action in DAF is to overhear the packet transmitted by the source node, decode it, and retransmit it to the destination node, improving the reception quality of the (combined) signal at the destination node. This cooperative scheme lends itself to a relatively easy implementation in hardware and software. Moreover, it is shown in that such a cooperative scheme can achieve full second-order diversity and therefore provides significant improvement to reception reliability.

5.2 General Principle of the Invention

The invention provides a technique for cooperation-aided communication in a network, and especially in a lossy and low power network. To do so, the invention discloses a technique for configuring a network which enable cooperative communication in a network comprising several nodes.

As already mentioned, such a network can be a wire or a wireless network, a cellular or a local network, and so on.

FIG. 3 presents the main steps of the method for configuring a network according to one embodiment of the invention.

More specifically, at least one node of the network, called a current node, implements at least one step of building a relay table 31 identifying at least one node of the network, called a relay node, which is directly connected to the current node and which has at least one parent node in common with at least one parent node of the current node.

It could be noted that such a network can be a hierarchical network or a mesh network. In the case of a hierarchical network, the parent node of a current node is a father node of the current node. The current node and the relay node have the same rank.

In the case of a mesh network, the parent node of a current node is a neighbouring node directly connected to the current node, and which can transmit information to the current node.

The "parent node" could thus also be called the "next hop node", which is defined by the routing protocol.

It is worth noting that it is possible for a node to have multiple parent nodes.

In a specific embodiment, said current node also implements a step of building a routing table 30 identifying parent nodes of the current node. Said step of building a routing table 30 could be implemented before the step of building a relay table 31.

In this case, the step of building the relay table 31 could compare the routing table of the current node with at least one routing table of at least one node directly connected to the current node, called a neighbouring node, and, if at least one common parent node is identified, could store an identifier of the neighbouring node in the relay table.

Said steps of building a routing table 30 and of building a relay table 31 could be repeated for each node of the network, excepted the root node.

FIG. 4 shows an example of the building of relay tables according to this specific embodiment.

For example, node B is the current node. Node C is directly connected to the current node B, so nodes B and C can exchange their routing tables. In the routing table of node B, node A is identified as a parent of node B. In the routing table of node C, node A is identified as a parent of node C. As a consequence, node A is a common parent to node B and node C, and node C could be identified as a relay node in the relay table 41 of node B, and node B could be identified as a relay node in the relay table 42 of node C.

As shown in this example, the relay tables could also store the cost of the path between the current node and the relay node (cost of the path between node B and node C, when node B acts as the current node, or cost of the path between node C and node B, when node C acts as the current node).

In other words, according to this specific embodiment, at least one node of the network should maintain two tables, a routing table and a relay table. If we consider a hierarchical routing tree such as a DODAG, each node (distinct from the root node) should maintain two tables in the stage of topology formation:
- the routing table, which comprises a list of parents toward the root; and
- the relay table, which comprises a set of candidate nodes that can serve as relay between the node itself and its parents.

For example, each node of the network builds up its routing table through DIO (Directed acyclic graph Information Object) message. The routing table can thus be built using the well-known distance-vector routing protocol to calculate the shortest end-to-end path. Neighbouring nodes can periodically exchange routing tables to check if they have the same parent. If so, each of them will be selected as a candidate relay for the other and added to the corresponding relay table. In this way, the relay table constructs a relay link between both sides where cooperative transmission can be performed.

Once the relay table associated with at least one current node has been built, it can be used to achieve cooperation-aided communication.

The main steps of the method for transmitting data in a network according to one embodiment of the invention are disclosed in FIG. 5.

We consider again a current node, for example node B, for which a relay table 41 has been built.

During a first step 51, the relay table 41 associated with the current node B is read.

During a second step 52, a relay node, which can be used to relay data between the current node B and its parent node A, is selected from the relay table 41. In the example illustrated in FIG. 4, the selected relay node is node C.

During a third step 53, data are transmitted from the current node B to the parent node A directly (path B-A) and via the relay node C (paths B-C and C-A). As a consequence, the parent node A receives and combines data from both the current node B and the relay node C.

In other word, when a node transmits its packet toward the root, the next hop is determined by the routing table. If the relay table associated with the current node is not empty, the node itself will select one relay from the candidates and perform the cooperative transmission, for example of the DAF type. If several relay nodes are available, we can choose the relay node with the largest residual energy in order to extend the network lifetime and achieve energy efficiency. In other word, the selected path should be the one that give the best performance to a node.

Therefore, at least one of enhanced reception reliability and reduced energy consumption are expected during the transmission of each hop/on each link.

5.3 Simulation Results

We now describe the performance of the cooperation-aided method for configuring a network and for transmitting data in the network according to at least one embodiment of the invention.

As shown in FIG. 6A, we first consider a grid network topology for multipoint-to-point simulation, where the designated root N1 is located at the centre of a 100 meters×100 meters region, with twelve surrounding nodes or equipments, referenced N2 to N13, in the peripheral area. According to the number of hops to the root, the surrounding nodes can be divided into two categories based on the routing protocol, for example of the RPL type, namely the rank 1 for nodes N2 to N5 (which are located at one hop from the root N1) and the rank 2 for nodes N6 to N13 (which are located at two hops from the root N1).

After implementing the method for configuring a network according to a specific embodiment as described above, we obtain a routing table and a relay table for each node except the root node, which can be defined as follows:

| Node index | Parent node(s) | Relay node(s) |
|---|---|---|
| N2 | N1 | N3, N5 |
| N3 | N1 | N2, N4 |
| N4 | N1 | N3, N5 |
| N5 | N1 | N2, N4 |
| N6 | N2 | N13 |
| N7 | N3 | N8 |
| N8 | N3 | N7 |
| N9 | N4 | N10 |
| N10 | N4 | N9 |
| N11 | N5 | N12 |
| N12 | N5 | N11 |
| N13 | N2 | N6 |

In FIG. 6A, the solid lines are next-hop links and the dashed lines are relay links.

Throughout the simulation, we set the path-loss exponent $\alpha=3$, the data rate $b=1$ bps/Hz and the targeted error rate is 0.01. The transmission range is 45 meters. A total of 1000 packets are transmitted to the root from random selected source using a routing protocol of the RPL type.

FIG. 6B shows the normalized total energy consumption of each node, with the index of the node in abscissa and the normalized total transmission power consumption in ordinate. For each node, the left line represents the results when using RPL routing protocol according to prior art, and the right line represents the results when using the cooperation-aided method for configuring the network and transmitting data according to the disclosed invention.

We can note that each node consumes less energy in the cooperation-aided approach compared to the RPL according to prior art. Furthermore, it is worth noting that the performance of lower rank nodes (nodes N2, N3, N4 and N5, close to the root N1) with cooperation is closed to the performance of higher rank nodes (nodes N6 to N13) without cooperation (see reference number 61), which shows that the lower rank nodes with heavy traffic actually benefit more from cooperative transmission.

We now consider, as a different example, a random network topology as shown in FIG. 7A, where the root N1 stays at position (40 m, 40 m) in the network, with nine randomly located nodes referenced N2 to N13. According to the number of hops to the root N1, the surrounding nodes can be divided into four categories based on the routing protocol, for example of the RPL type, namely the rank 1 for nodes N3, N7, N9 and N10 (which are located at one hop from the root N1), the rank 2 for nodes N2, N4 and N6 (which are located at two hops from the root N1), the rank 3 for node N5 and the rank 4 for node N8.

After implementing the method for configuring a network according to a specific embodiment as described above, we obtain a routing table and a relay table for each node except the root node, which can be defined as follows:

| Node index | Parent node(s) | Relay node(s) |
|---|---|---|
| N2 | N7 | N3, N4, N6 |
| N3 | N1 | N7, N9, N10 |
| N4 | N7 | N2, N6 |
| N5 | N2 | none |
| N6 | N7 | N2, N3, N4 |
| N7 | N1 | N3, N10 |
| N8 | N5 | none |
| N9 | N1 | N3, N10 |
| N10 | N1 | N7, N9, N10 |

Without changing the parameters, the routing path is generated by the method for configuring the network according to the invention, with next-hop links (solid lines) and relay links (dashed lines).

FIG. 7B shows the normalized total energy consumption of each node, with the index of the node in abscissa and the normalized total transmission power consumption in ordinate. For each node, the left line represents the results when using RPL routing protocol according to prior art, and the right line represents the results when using the cooperation-aided method for configuring the network and transmitting data according to the disclosed invention.

To analyse the simulation result, we divide the nine nodes into two groups: the cooperation group (nodes N2, N3, N4, N6, N7, N9 and N10) and direct transmission group (nodes N5 and N8).

We can note that the nodes in the cooperation group can significantly reduce their energy consumption thanks to the help of the relay. For nodes N5 and N8, as there are no relay nodes available, the energy consumption is the same than the one with direct transmission. Furthermore, it is worth noting that the nodes especially with heavy traffic load (e.g., nodes N2 and N7) successfully gain a satisfactory level of benefit from cooperation, which is consistent with the results shown in FIG. 7B.

The disclosed invention thus proposes an effective solution to incorporate cooperative communication with routing protocol of the RPL type to achieve at least one of communication reliability and energy efficiency. For example, the new cooperation-aided RPL protocol enables wireless ad-hoc networks to improve radio unreliability and meet future application requirements of high-speed and high-quality services with high energy efficiency. The acquired new insights on the network performance of the proposed invention can also provide precise guidelines for efficient designs of practical and reliable communications systems. Hence these results will potentially have a broad impact across a range of related areas, including wireless communications, network protocols and radio transceiver design.

It should also be noted that the invention is not limited to be implemented into a routing protocol of the RPL type, but could be implemented into any other routing protocols, in particular when the routing features can maximize the utility of cooperative communication. In addition, energy efficiency is also a key issue for M2M communications.

5.4 Structure of an Equipment

Referring to FIG. 8, we finally present the simplified structure of an equipment for configuring a network comprising several nodes and for transmitting data in said network, according to the embodiments described here above.

Such an equipment, also called a node or current node, comprises a memory 81 comprising a buffer memory, a processing unit 82 equipped for example with a microprocessor µP and driven by the computer program 83, implementing at least one of the method for configuring a network and the method for transmitting data in said network according to an embodiment of the invention.

At initialization, the code instructions of the computer program 83 are for example loaded into a RAM and then executed by the processor of the processing unit 82. The microprocessor of the processing unit 82 implements the steps of the method for configuring a network and/or the steps of the method for transmitting data in said network described here above according to the computer program instructions 83 to perform cooperation aided communication.

To this end, the current node comprises, in addition to the buffer memory 81, a module for configuring the current node 84 and a module for data transmission 85, wherein the module for configuring the current node 84 comprises means for building a relay table identifying at least one relay node and wherein the module for data transmission 85 comprises means for reading the relay table built for the current node, means for selecting a relay node from the relay table, and means for transmitting data from the current node to the parent node directly and via the relay node, so that the parent node can receive and combine data from both the current node and the relay node. These means are driven by the microprocessor of the processing unit 82.

Although the present disclosure has been described with reference to one or more examples, workers skilled in the art will recognize that changes may be made in form and detail without departing from the scope of the disclosure and/or the appended claims.

The invention claimed is:

1. A cooperation-aided method for configuring a network comprising: several nodes, wherein at least one node of said network, called a current node, implements a step of building a relay table identifying at least one node of the network, called a relay node, which is directly connected to the current node and which has at least one parent node in common with at least one parent node of the current node, wherein said relay table enables selecting the relay node to relay data between the current node and one of said at least one parent node of the current node, wherein the relay node is a supplementary node cooperating with the current node by sharing its own resources.

2. The method according to claim 1, wherein said current node also implements a step of building a routing table identifying parent nodes of said current node, and wherein said step of building the relay table compares the routing table of the current node with at least one routing table of at least one node directly connected to the current node, called a neighbouring node, and, if at least one common parent node is identified, stores an identifier of the neighbouring node, which is a relay node, in the relay table.

3. The method according to claim 1, wherein the step of building the relay table comprises storing a cost associated with a path between the current node and said at least one relay node.

4. The method according to claim 1, wherein the step of building the relay table is implemented periodically.

5. The method according to claim 1, wherein the nodes of the network are organized according to a directed acyclic graph.

6. The method according to claim 2, wherein the step of building the routing table comprises a step of receiving a directed acyclic graph information object message.

7. The method according to claim 1, wherein the network is a multi-hop wireless network.

8. The method according to claim 1, wherein the network is a low power and lossy network.

9. The method according to claim 2, wherein the step of building the relay table comprises storing a cost associated with a path between the current node and said at least one relay node.

10. The method according to claim 5, wherein the step of building the routing table comprises a step of receiving a directed acyclic graph information object message.

11. A cooperation-aided method for transmitting data in a network comprising: several nodes, wherein at least one node of said network, called current node, is configured to implement a step of building a relay table identifying at least one node of the network, called a relay node, which is directly connected to the current node and which has at least one parent node in common with at least one parent node of the current node, and wherein said current node implements a step of data transmission comprising the following steps:
   reading the relay table built for the current node,
   selecting a relay node from the relay table, which can be used to relay data between the current node and one of said at least one parent node of the current node,
   transmitting data from the current node to the parent node directly and via the relay node,
so that the parent node can receive and combine data from both the current node and the relay node, wherein the relay node is a supplementary node cooperating with the current node by sharing its own resources.

12. The method according to claim 11, wherein the step of transmitting data to the parent node via the relay node implements a decode-and-forward algorithm.

13. The method according to claim 11, wherein the step of selecting chooses the relay node which has the largest residual energy when several relay nodes are available to relay data between the current node and the parent node.

14. The method according to claim 11, wherein the network is a multi-hop wireless network.

15. The method according to claim 11, wherein the network is a low power and lossy network.

16. Equipment for configuring a network comprising several nodes and transmitting data in said network, wherein said equipment, called current node, comprises:
   at least one processor; and
   a non-transitory computer-readable medium comprising instructions stored thereon, which when executed by the at least one processor configure the current node to perform acts comprising:
      building a relay table identifying at least one node of the network, called a relay node, which is directly connected to the current node and which has at least one parent node in common with at least one parent node of the current node,
      reading the relay table built for the current node,
      selecting a relay node from the relay table, which can be used to relay data between the current node and one of said at least one parent node of the current node, and transmitting data from the current node to the parent node directly and via the relay node, so that the parent node can receive and combine data from both the current node and the relay node, wherein the relay node is a supplementary node cooperating with the current node by sharing its own resources.

17. A non-transitory computer readable medium comprising: a computer program stored thereon comprising instructions to implement a method for configuring a network comprising several nodes, when said program is executed by a processor, wherein at least one node of said network, called a current node, implements a step of building a relay table identifying at least one node of the network, called a relay node, which is directly connected to the current node and which has at least one parent node in common with at least one parent node of the current node, wherein said relay table enables selecting the relay node to relay data between the current node and one of said at least one parent node of the current node, wherein the relay node is a supplementary node cooperating with the current node by sharing its own resources.

18. A non-transitory computer-readable medium comprising: a computer program stored thereon comprising instructions to implement a method for configuring a network comprising several nodes, when said program is executed by a processor, wherein at least one node of said network, called current node, is configured to implement a step of building a relay table identifying at least one node of the network, called a relay node, which is directly connected to the current node and which has at least one parent node in common with at least one parent node of the current node, and wherein said current node implements a step of data transmission comprising the following steps:

reading the relay table built for the current node, selecting a relay node from the relay table, which can be used to relay data between the current node and one of said at least one parent node of the current node, transmitting data from the current node to the parent node directly and via the relay node, so that the parent node can receive and combine data from both the current node and the relay node, wherein the relay node is a supplementary node cooperating with the current node by sharing its own resources.

* * * * *